United States Patent
Fang et al.

(10) Patent No.: US 8,427,164 B2
(45) Date of Patent: Apr. 23, 2013

(54) APPARATUS AND METHOD FOR REDUCING EFFECTS OF ECCENTRICITY IN INDUCTION TOOLS

(75) Inventors: Sheng Fang, Houston, TX (US); David R. Beard, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 316 days.

(21) Appl. No.: 12/832,678

(22) Filed: Jul. 8, 2010

(65) Prior Publication Data

US 2011/0006775 A1 Jan. 13, 2011

Related U.S. Application Data

(60) Provisional application No. 61/224,364, filed on Jul. 9, 2009.

(51) Int. Cl.
*G01V 3/00* (2006.01)
(52) U.S. Cl.
USPC .......................................................... 324/338
(58) Field of Classification Search .................... 324/338
See application file for complete search history.

(56) References Cited

U.S. PATENT DOCUMENTS

| | | | |
|---|---|---|---|
| 5,710,511 A | 1/1998 | Taicher et al. | |
| 6,166,540 A | 12/2000 | Wollin | |
| 6,680,613 B2 | 1/2004 | Rosthal et al. | |
| 6,693,430 B2 | 2/2004 | Rosthal et al. | |
| 6,838,876 B2 | 1/2005 | Kruspe et al. | |
| 7,150,316 B2 | 12/2006 | Itskovich | |
| 7,414,391 B2 * | 8/2008 | Homan et al. | 324/202 |
| 2005/0083161 A1 | 4/2005 | Minerbo et al. | |
| 2008/0111554 A1 | 5/2008 | Wang et al. | |

FOREIGN PATENT DOCUMENTS

JP 1070031 3/1989

* cited by examiner

*Primary Examiner* — Reena Aurora
(74) *Attorney, Agent, or Firm* — Cantor Colburn LLP

(57) ABSTRACT

In aspects, an apparatus for use in a wellbore for determining a property of an earth formation is provided. The apparatus, in one embodiment, may include a tool body including a transmitter configured to induce electromagnetic waves in an earth formation, a receiver configured to provide signals responsive to the induced electromagnetic waves, a conductive member between the transmitter and the receiver extending radially from the tool body and configured to reduce propagation of eddy currents between the transmitter and the receiver when the tool body is in a wellbore and a processor configured to process the signals provided by the receiver to determine the property of the earth formation.

20 Claims, 5 Drawing Sheets

| Case # | Hxx (centered) | Hxx (0.5" ecc.) | % Change | Comments |
|---|---|---|---|---|
| 1 | 0.885E-4 | 2.192E-4 | 147.7 | Without Conductive Member (4") |
| 2 | 0.976E-4 | 0.871E-4 | -10.7 | With Conductive Member |
| 3 | 1.019E-4 | 0.807E-4 | -20.8 | Radially Extended Secondary Conductive Member |
| 4 | 0.746E-4 | 0.871E-4 | 16.8 | Case 2 with Larger Borehole (6") |
| 5 | 0.753E-4 | 0.700E-4 | 7.0 | Case 4 with Longer Secondary Conductive Member (10") |

APPARATUS AND METHOD FOR REDUCING EFFECTS OF ECCENTRICITY IN INDUCTION TOOLS

CROSS REFERENCES TO RELATED APPLICATIONS

This claims priority from the U.S. Provisional Patent Application having the Ser. No. 61/224,364 filed Jul. 9, 2009.

BACKGROUND OF THE DISCLOSURE

1. Field of the Disclosure

The disclosure herein relates generally to the use of resistivity tools for determination of properties of earth formations.

2. Background of the Art

Electromagnetic induction resistivity well logging instruments or tools are used to determine the electrical conductivity and its converse, resistivity, of earth formations penetrated by a borehole. Formation conductivity is determined based on results of measuring the magnetic field of eddy currents induced in the formation adjoining the borehole. The electrical conductivity is used for, among other things, inferring the properties of the formation fluid. Typically, low conductivity (high resistivity) is associated with hydrocarbon-bearing earth formations.

Multi-component induction measurement tools are often utilized to measure horizontal and vertical resistivities (or conductivities), relative dip angles, strike angles, sand and shale content and water saturation. In addition, multi-component measurements may be used for analysis of fractured earth formations that may also have anisotropic layers. Often the induction tool is eccentric in the borehole during logging of non-vertical sections of the borehole. When the tool is eccentric, the current induced in borehole fluid by the transmitted signals is asymmetric and thus interferes with the signals received by the receivers from the formation. In some cases, the effects of eccentricity on the measurements can be severe. Some multi-component induction tools utilize spaced electrodes on the tool to reduce the effects of eccentricity. Others tools apply multi-frequency focus techniques. The results, in certain cases, still may not be satisfactory.

The present disclosure provides improved apparatus and methods that reduce the effects of eccentricity on the resistivity measurements.

SUMMARY

In one aspect, an apparatus for reducing the effects of tool eccentricity on resistivity measurements is provided. In one embodiment, the tool may include: at least one transmitter on a tool body configured to induce electrical signals in a formation surrounding a wellbore; at least one receiver on the tool body spaced from at least one transmitter configured to receive electrical signals from the formation responsive to the induced signals in the formation; and a conductive member between the at least one transmitter and the at least one receiver extending radially from the tool body and configured to reduce or inhibit propagation of eddy currents produced by the electrical signals transmitted by the at least one transmitter between the at least one transmitter and the at least one receiver through the wellbore fluid.

Another embodiment disclosed is a method of reducing the effects of tool eccentricity on resistivity measurements in a wellbore. In one aspect, the method may include: positioning a logging tool having tool body, a transmitter on the tool body, a receiver on the tool body and a conductive member between the transmitter and the receiver that extends radially from tool body to reduce or inhibit passage of eddy currents from the transmitter to the receiver through a fluid in the wellbore; energizing the transmitter to induce electromagnetic waves in the formation; receiving signals from the formation by the receiver responsive to the induced electromagnetic waves in the formation; and processing signals from the receiver to provide a resistivity property of the formation.

Examples of certain aspects of a method and an apparatus for reducing the effects of eccentricity of the tool in wellbore on electrical measurements have been summarized rather broadly in order that the detailed description thereof that follows may be better understood and in order that the contributions they represent to the art may be appreciated. There are, of course, additional features of the disclosure that will be described hereinafter and which will form the subject matter of this application.

BRIEF DESCRIPTION OF THE FIGURES

The present disclosure is best understood with reference to the following figures in which like numbers generally refer to like elements and in which:

FIG. 6 is a table showing simulated results of the receiver measurements for several tool design options with and without a radially extending conductive member between the transmitter and the receiver.

DETAILED DESCRIPTION

Figure 1:
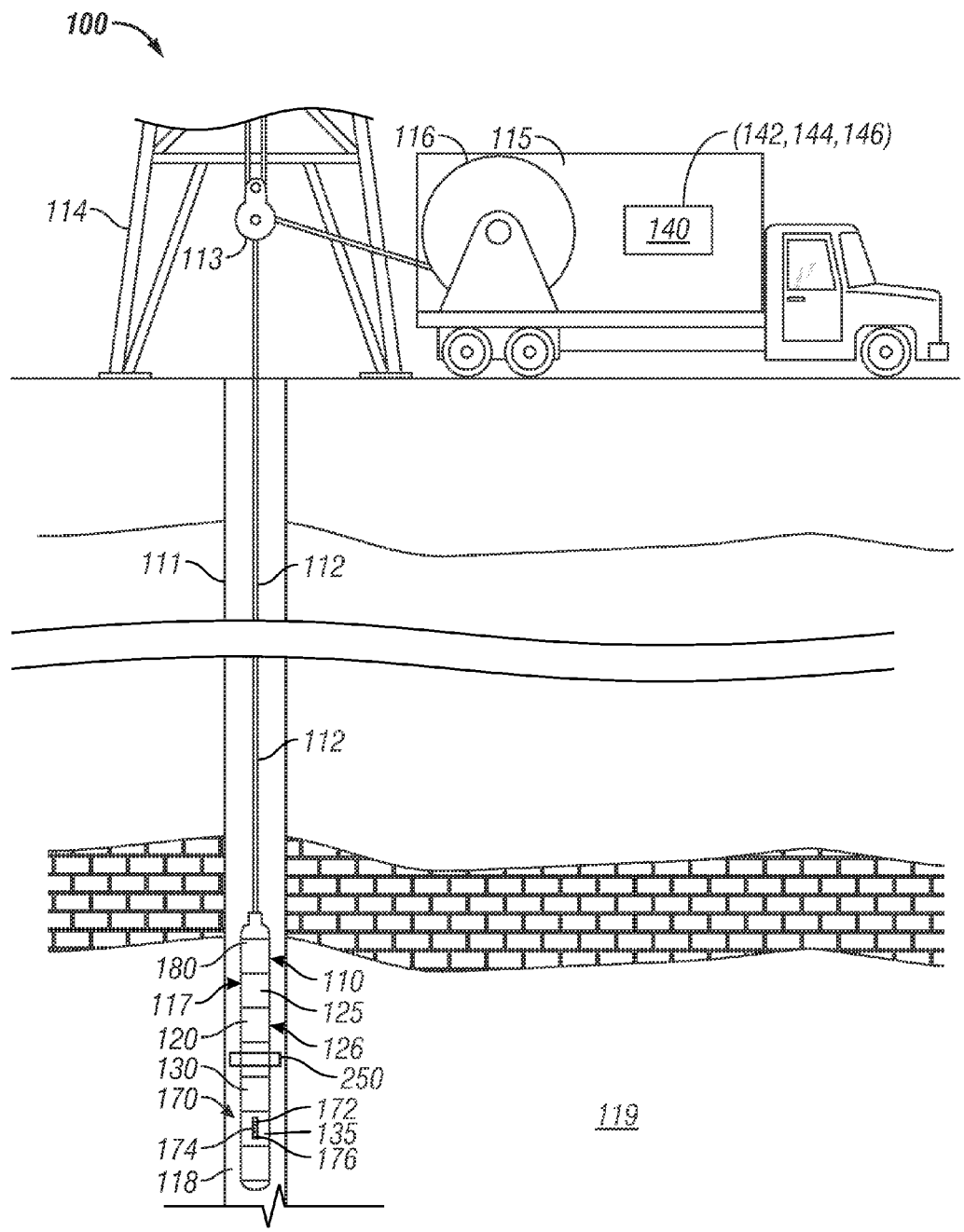
FIG. 1 illustrates an induction tool disposed in a wellbore penetrating an earth formation.

Referring to FIG. 1, an electromagnetic induction well logging apparatus 100 and logging tool 110 (also referred to as the "induction tool" or "logging instrument") having a tool body 117 is shown conveyed by a conveying member 112 in a wellbore 111 drilled through an earth formation 119. The conveying member 112 may be any suitable member, including, but not limited to, an armored cable, slick line, coiled-tubing, and jointed tubular. For explanation purposes only, and not as a limitation, the conveying member 112 shown is a wireline attached to the induction tool 110 and conveyed in the wellbore via a pulley 113 attached to a surface structure 114, such as a rig. The conveying member 112 may be placed on a winch 116 on a platform 117, such as a logging truck. In aspects, the induction tool 110 may include a transmitter section 120 having one or more transmitter coils and a receiver section 130 spaced from the transmitter section 120 having one or more receiver coils. The induction tool 110, in one aspect, includes a receiver electronic section 135 that includes circuits to receive signals from the receivers 120, amplify and digitize such signals and provide the digitized signals to controller 170. The controller 170 may further include a processor 172, such as a microprocessor, for processing data according to programmed instructions, a data storage device, such as a solid-state memory, and programs containing instructions and other data accessible to the processor 172. The induction tool 110 also includes transmitter circuitry 125 to cause the transmitter to generate electromagnetic signals according to the instruction provided by the controller 170. The system 100 may further include controller 140 at the surface in two-way communication with the controller 170. The controller 140 may be a computer-based system that includes a computer and selected peripherals, such as display devices. In operation, the transmitters induce electromagnetic signals into the earth formation and the receivers receive voltage signals from the formation responsive to the induced electromagnetic signals, which signals are processed by the controller 170. The wellbore is often deviated and thus the induction tool while logging the wellbore becomes eccentric, i.e., the tool axis and the wellbore axis are not parallel. Electromagnetic waves generated by the transmitters in the transmitter section 120 cause eddy currents to flow to the receivers in the receiver section 130 through the fluid 118 in the borehole 111. When the induction tool 110 is eccentric with respect to the wellbore, the eddy currents become asymmetric and interfere with the receiver measurements. The offset between the center line of the tool 110 and the centerline of the borehole 111 is defined as the eccentricity. To reduce the effect of eccentricity on the receiver measurements, in one aspect, the induction tool 110 may be provided with conductive member 250 between the transmitter section 120 and the receiver section 130. The conductive member 250 extends radially from the induction tool body to inhibit or reduce the eddy currents passing from the transmitters in the transmitter section 120 to the receivers in the receiver section 130 through the fluid 118. The conductive member 250 may be a metallic member or may include metallic sections of desired dimensions. Certain embodiments of the conductive member 250, placement of such conductive members on the induction tool 110 and the operation of the induction tool 110 with such a conductive member are described in more detail in reference to FIGS. 2-6.

The auxiliary electronics unit 126 may include one or more transmitters (also referred to as signal generators) and power amplifiers configured to cause alternating currents of selected frequencies to flow through transmitter coils in the coil mandrel unit 118. A controller 170 coupled to the transmitters in the transmitter section 120 controls the operation of the induction tool 110 and processes signals received from the receiver coils in the receiver section 130. In one aspect, the controller 170 may include a processor 172, such as microprocessor, a storage device 174, such as solid-state memory and computer programs 176 that may include instructions, data and models. Alternatively, some or all of the processing and control may performed by a surface controller 140. The surface controller may include a processor 142, such as a microprocessor, a storage device 144, such as a solid-state memory, tape or disk, and one or more programs 146 that include instructions and computer models. The example in FIG. 1 shows a vertical well for ease of explanation and is not to be construed as a limitation. The apparatus and methods described herein apply to non-vertical wells.

Figure 2:
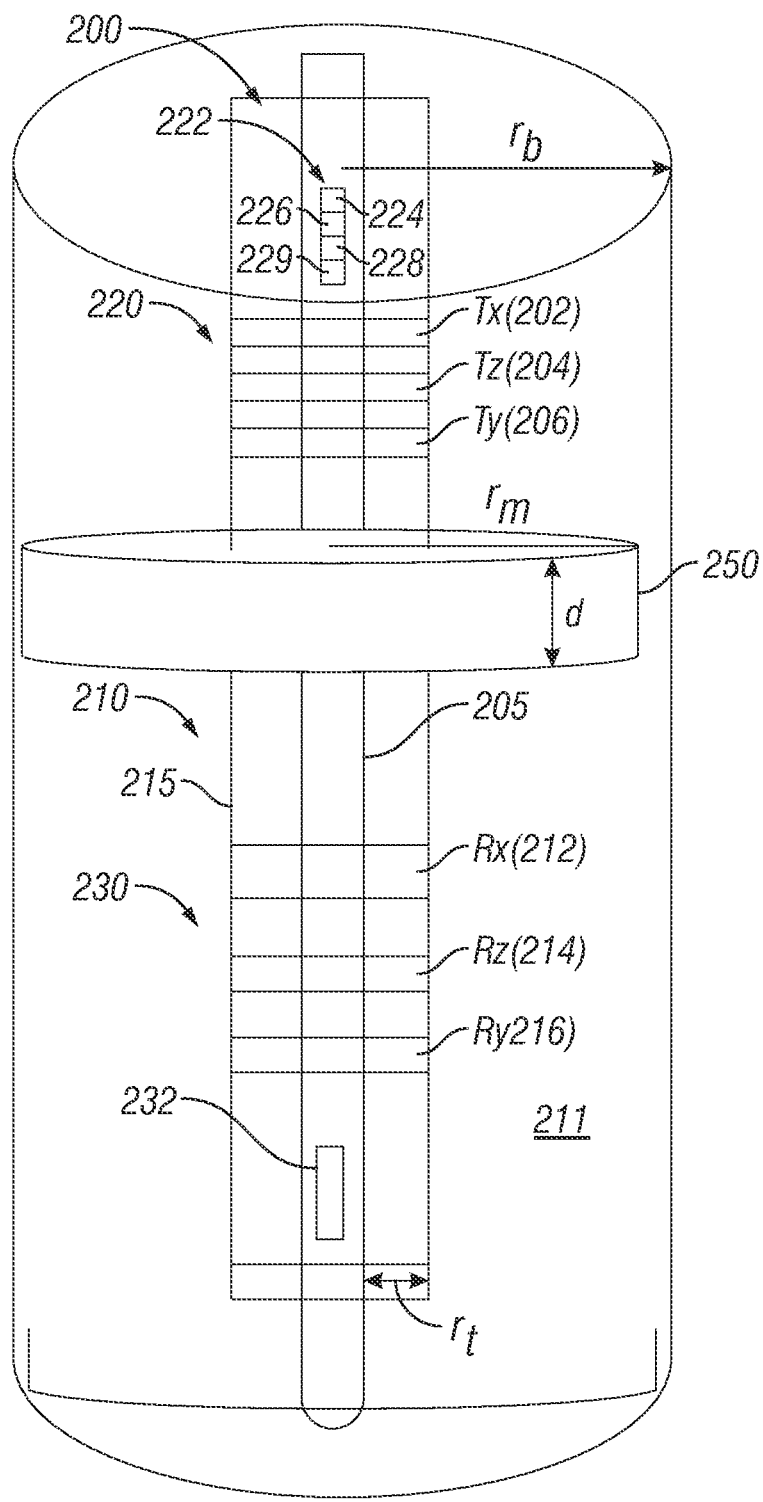
FIG. 2 illustrates an embodiment of an induction tool with a conductive member between a transmitter and a receiver to reduce eccentricity effects on receiver measurements.

FIG. 2 illustrates an embodiment of an induction tool 200 with a conductive member 250 configured to reduce eccentricity effects on receiver measurements, according to one embodiment of the disclosure. The induction tool 200 is shown placed inside a wellbore 111 having a borehole radius $r_b$. In one aspect, the conductive member 250 extends radially from the tool body 210 into the wellbore 111. The conductive member 250 may be made from any suitable material and in any suitable shape and form. In one aspect, the conductive member 250 may be metallic, include metallic elements or a combination of metallic and non-metallic elements. The conductive member 250 is shown as a circular member in FIG. 2. The tool 200 is shown to include a tool body 210 having a tool radius or an outer radius $r_t$. The tool 200 includes a central longitudinal carrier 205 configured to carry electrical circuits for the tool 200 and an insulating member 215 around the carrier 205.

Still referring to FIG. 2, the tool 200 is shown to include a transmitter section 220 that may include one or more transmitter coils. Three transmitters 202, 204 and 206, referred to as the $T_x$, $T_z$, and $T_y$ transmitters, are shown (the z-axis is the longitudinal axis of the tool). The transmitters $T_x$, $T_y$ and $T_z$, are at an angle to each other and in one embodiment may be orthogonal or substantially orthogonal to each other. Corresponding to the transmitters $T_x$, $T_z$ and $T_y$, the tool 200 includes associated receivers 212, 214 and 216, referred to as the $R_x$, $R_z$, and $R_y$ receivers, in the receiver section 230. The receivers measure electromagnetic fields from the earth formation responsive to electromagnetic waves induced by their corresponding transmitters. The tool 200 may also utilize non-orthogonal configurations of the transmitters and receivers. The tool 200 includes a circuit 222 configured to control the operation of the transmitters. Circuit 222 may include a controller 224 that includes a processor 226, data storage device 228 accessible to the processor 226 and programs 229 stored in the data storage device 228 for controlling the operations of the transmitters. A receiver circuit 232 may be provided to process signals from the receivers and provide the processed signals to the processor 226 for further processing. In operation, the controller 222 may independently excite the transmitters $T_x$, $T_z$ and $T_y$. The receivers $R_x$, $R_z$ and $R_y$ respectively receive signals $R_{xx}$, $R_{zz}$ and $R_{yy}$ corresponding to the electromagnetic fields $H_{xx}$, $H_{yy}$ and $H_{xy}$ (not shown) induced by the transmitters $T_x$, $T_z$ and $T_y$ in the formation 119 (FIG. 1) The processor 226 and/or the processor 140 (FIG. 1) at the surface may process the received signals and provide a measure of resistivity (or, conversely, conductivity) of the formation 119.

Still referring to FIG. 2, the tool 200, in one aspect, may further include a conductive member 250 configured to reduce the passage of eddy currents through the borehole fluid 211 from the transmitters 220 to the receivers 230 and thus the effect of eccentricity on the receiver measurements. In one embodiment, the conductive member 250 may have a radius $r_m$ that is greater than the radius $r_t$ of the tool and less than the radius $r_b$ of the borehole 110.

Figure 3:
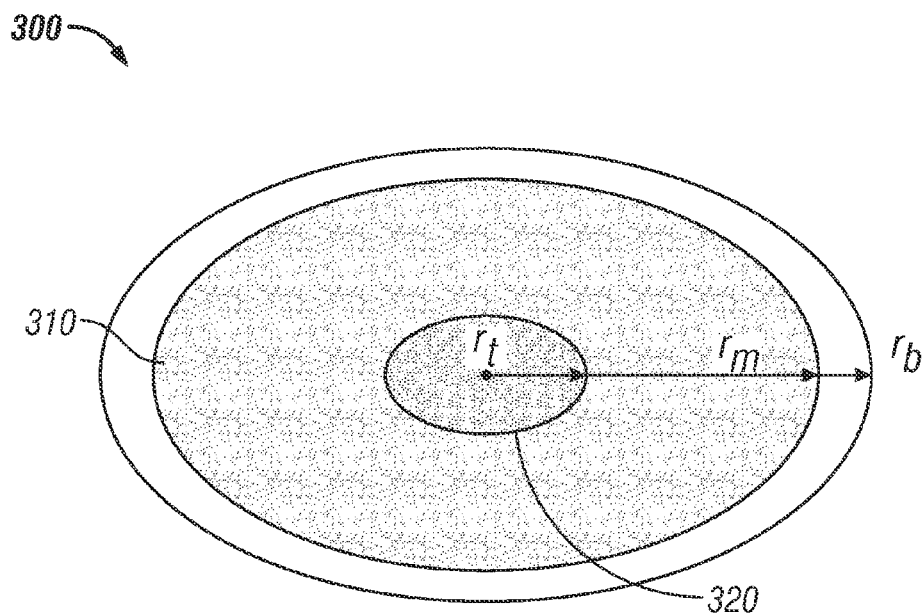
FIG. 3 shows an embodiment of a conductive member that may be utilized to reduce eccentricity effects on receiver measurements of an induction tool, such as the tool shown in FIG. 2.

FIG. 3 shows a top view of a conductive member 300 made according to one embodiment of the disclosure. The conductive member 300 may be utilized in an induction tool to reduce the effect of eccentricity. In one configuration, the conductive member 300 may be shaped as disc having an outer periphery 310 and an inner hole 320. The disk member 310 has a radius $r_m$. The hole 320 is dimensioned to fit on the outside of the tool body 210 (FIG. 2). Excitations of a transmitter in the tool produce eddy currents in the fluid 211 in the borehole 110. The conductive member 300 may be made from any material that reduces or inhibits the passage of flow of such eddy currents from the transmitter to the receivers through the fluid 211 in the borehole 110. The disc member 310 or portions thereof, in one aspect, may be made from any suitable metallic material. Combinations of metallic and nonmetallic elements may also be used to form the disc member 310. The conductive member 300 may be made of sufficient strength so that it, in a configuration, can centralize the tool 200 when the tool 200 is moved in the borehole 110 during logging of the borehole 110. The conductive member 300 may have a suitable depth "d" (FIG. 2) to provide stability and/or strength to the conductive member. The dimensions (outside dimensions, shape, thickness, depth "d," etc.) and the type of material may be chosen based on the tool size, borehole diameter, wellbore deviation and any other factor. Although a circular conductive member is described, the conductive member may have any other shape and dimensions for the purpose of this disclosure. In general, it is desirable to reduce the gap between the conductive member 300 and the borehole 110 to an extent that provides a desired reduction in the effects of eccentricity on the receiver measurement while logging a borehole.

Figure 4:
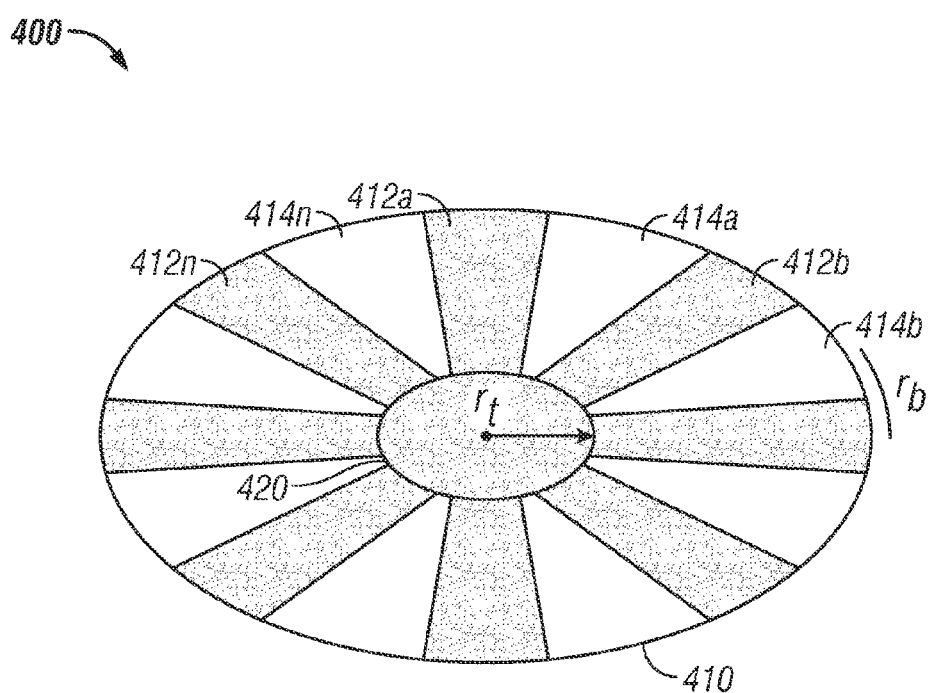
FIG. 4 shows an alternative embodiment of a conductive member that may be utilized to reduce eccentricity effects on receiver measurements of an induction tool, such as the tool shown in FIG. 2.

FIG. 4 shows a top view of a conductive member 400 made according to another embodiment. The conductive member 400 may be utilized in an induction tool to reduce the eccentricity effect on the receiver measurements. The conductive member 400 is shown to in the form of a circular wheel having an outer ring 410 and an inner ring 420 joined by a number of spaced conducive spoke members 412a-412n. Each spoke member may be made using a suitable conductive material, such as a metal or an alloy or a combination of metallic and non-metallic elements. The spaces or gaps between the adjacent spokes are designated by numerals 414a-414n. The inner ring 420 may be dimensioned to couple to the outside of the tool body 210. The conductive member 400 enables the fluid 211 in the borehole to flow through the spaces 214a-214n when the tool is moved during logging operations. The number, size and dimensions of each of the spokes 412a-412n may be chosen to reduce the eccentricity effect on the receiver measurements to a desired extent.

Figure 5:
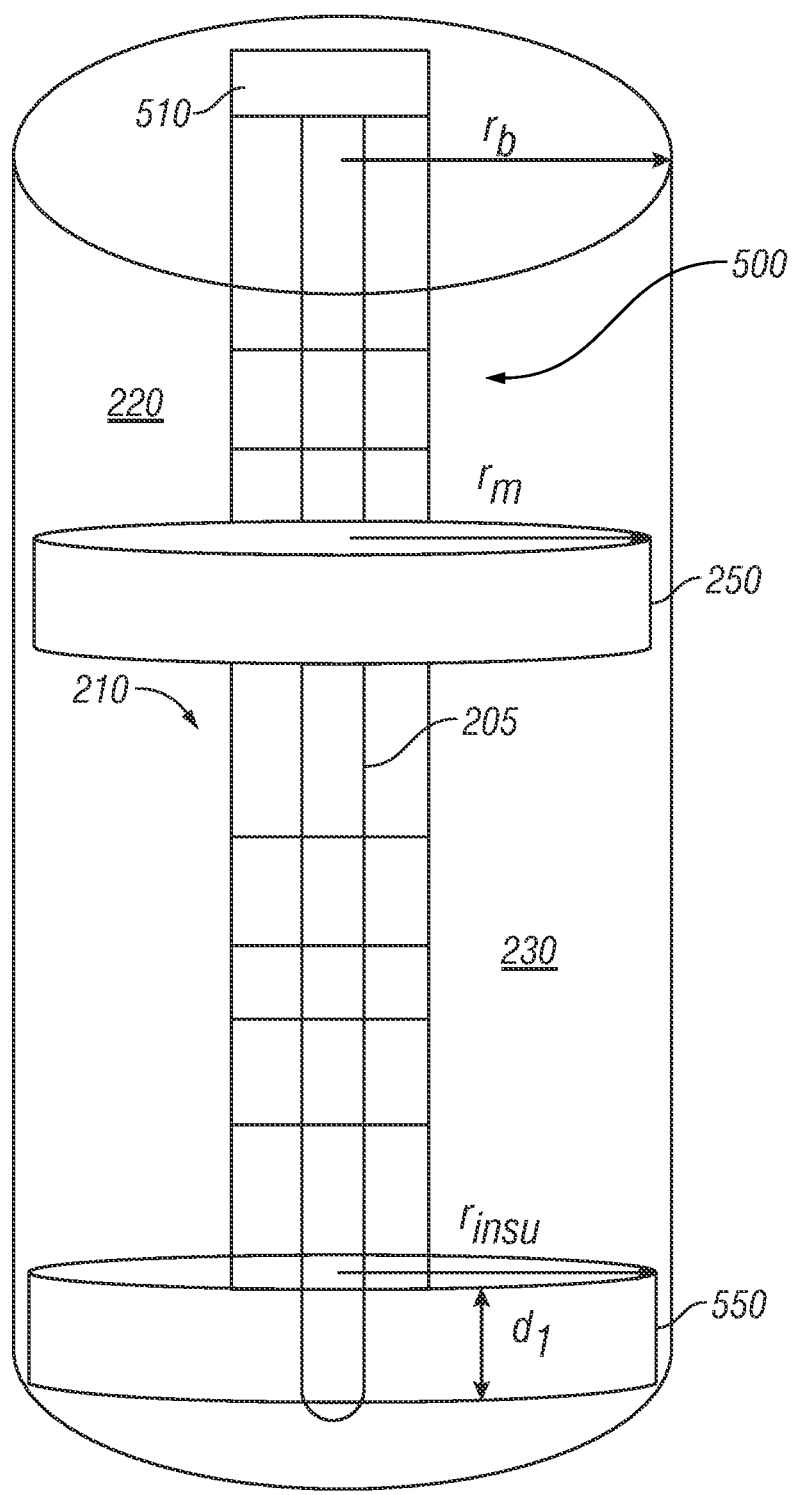
FIG. 5 illustrates the induction tool shown in FIG. 2 with a secondary conductive member spaced from the transmitter to further reduce the eccentricity effects on the receiver measurements and an optional non-conductive centralizer configured to centralize the induction tool in a wellbore.

FIG. 5 shows an induction tool 500 that represents the same tool 200 (FIG. 2) but further includes a secondary conductive member 510 (also referred to as a mandrel or electrode) uphole of the transmitter section 220 to further reduce eccentricity effects on the receiver measurements. The secondary conductive member 510 may be made from any suitable conductive material, such as metal, a combination of metals and a combination of metallic and non-metallic components. The secondary conductive member 510 extends radially outward from the tool body 210. In one aspect, the secondary conductive member 510 may extend up to the outer dimensions of the tool body 210 of the tool 500. An optional non-conductive or substantially non-conductive centralizer 550 of a selected depth $d_1$ may be provided at any location on the tool 510 to aid the tool 500 to center in the borehole 110. The radius $r_{insu}$ of the centralizer 550 is less than the borehole radius $r_b$. The centralizer 550 may be attached to the tool body 210 in any suitable manner. The dimensions, material and strength of the centralizer 550 may be chosen to provide a desired stability to the tool 500 during logging of the borehole.

For a multi-component logging tool, such as shown in FIG. 2, the principal component corresponding to the eccentricity direction (direction of displacement of the tool) in the borehole is unaffected by the eccentricity, i.e., if the tool is displaced in the x-direction, the $H_{xx}$ component is unaffected by the eccentricity. All other components are affected by the eccentricity. FIG. 6 is a table showing the effect of eccentricity on receiver measurements of an induction tool with and without a conductive member. Column 601 shows the various case scenarios; column 602 shows $H_{xx}$ measurement by a receiver when the tool is centered, i.e., no eccentricity; column 603 shows $H_{xx}$ measurements by the receiver when the tool is positioned in the wellbore with a half inch (0.5 inch) eccentricity; column 604 shows the percent change in the $H_{xx}$ measurements due to a half inch eccentricity; and column 605 shows the tool configuration. In all cases the eccentricity is in the y-direction.

With the exception of the case scenario 5, all scenarios correspond to a borehole having a four inch radius. Case scenario 5 corresponds to a borehole radius of 6 inches. The gap between the conductive member and the borehole is a half inch all around. Case 1, Row 610 shows the simulated results for an induction tool without a conductive member between transmitter and receiver. For a centered tool, i.e., no eccentricity, the $H_{xx}$ (centered) measurement is 0.885E-4. The $H_{xx}$ (0.5" ecc.) measurement with a half inch eccentricity is 2.192E-4. The effect of a half inch eccentricity on the tool may be calculated as $H_{xx}$ (0.5" ecc.) minus $H_{xx}$ (centered) divided by $H_{xx}$ (0.5" ecc.) or (2,192–0.885E-5)/0.885E-5=147.7%. Case 2, Row 620 shows the effect of eccentricity for an induction tool with a conductive member. The percentage change is reduced to −10.7%. When extending radially the secondary conductive member placed above the transmitter, Case 3, Row 630, the effect of eccentricity is increased (−20.8%) indicating the radial extension of the secondary conductive member is not necessarily helpful.

Case 4, row 640 shows results when the borehole radius $r_b$=6 inches and the tool includes a conductive member. The eccentricity effect on the $H_{xx}$ measurement is 16.8% which is larger than the one from the small borehole (case 2). Case 5, row 650 shows an effect of 7% when a longer secondary conductive member (10" vertical dimension) is utilized on the tool used. A comparison of Case 2 with Case 1 shows that the use of a conductive member reduces the eccentricity effect from 147.75 to −10.7%. A comparison of the results of measurements shown in Case 5 and Case 2 shows an improvement from −10.7% to 7% when a longer secondary conductive member is used in conjunction with a conductive member between transmitter and receiver. The data in FIG. 6 shows that the use of a conductive member on an induction tool may reduce the effect of eccentricity. Further reduction in the eccentricity effect may be obtained by adding a secondary conductive member above the transmitter. The size, type and placement of the conductive member and/or the secondary conductive member may be chosen based on the tool dimension, borehole size and shape and any other factor so as to obtain a desired reduction on the effect of eccentricity on the receiver measurements of an induction tool.

The apparatus thus may reduce the effect of induced currents in the wellbore in two ways. The first is by physically blocking or inhibiting the eddy current propagating axially in the borehole. This is accomplished by the solid portion of the disk 300 and by the spoke members 414a-414n. The second is by physically reducing the eccentricity so that the effect of the eccentricity on components other than the principal component along the direction of eccentricity is reduced.

For the purpose of this disclosure, some or all of the processing may be done by a downhole processor, a processor at the surface, or a processor at a remote location. Implicit in the control and processing of the data is the use of a computer program on a suitable machine-readable medium that enables the processor to perform the control and processing. The machine readable medium may include, but not limited to, ROMs, EPROMs, EEPROMs, Flash Memories and optical disks. The disclosure may also be implemented in conjunction with a measurement-while-drilling tool in which the multi-component and multi-array measurements are made using a suitable device on a bottomhole assembly conveyed on a drilling tubular such as a drillstring.

Thus, the disclosure in one aspect provides an apparatus for use in a wellbore for determining a property of an earth formation. In one embodiment, the apparatus may include at least one transmitter on a tool body configured to induce electromagnetic waves in the earth formation surrounding the wellbore, at least one receiver on the tool body configured to provide electrical signals in response to the induced electromagnetic waves, a conductive member placed between the at least one transmitter and the at least one receiver, the conductive member extending outward from the tool body to inhibit propagation of eddy currents passing through the wellbore fluid between the at least one transmitter and the at least one receiver, and a processor configured to process the signals provided by the at least one receiver to determine the property of the earth formation. In another aspect, the tool may include multiple transmitters and multiple receivers forming a multi-component induction tool. In another aspect, the apparatus may further include a secondary conductive member spaced from the at least one transmitter configured to reduce an effect of eccentricity of the tool body in the wellbore on the signals provided by the at least one receiver. In another aspect, the apparatus may further include a non-conductive or substantially non-conductive member spaced from the at least one receiver to further reduce the effect of eccentricity of the tool body in the wellbore on the signals provided by the at least one receiver. The non-conductive member may be coupled to the tool body in any suitable manner and placed at any suitable location on the tool body. In one aspect, the conductive member may include a metallic member that extends radially away from the tool body. In another aspect, the conductive member may include a number of spaced apart members radially extending from or proximate the tool body. In yet another aspect, the conductive member may include one or more gaps between the one or more spaced apart members configured to allow passage of the wellbore fluid there through when the tool moves within the wellbore. In another aspect, the apparatus may also include a central conducting member and an outer insulating member, wherein the at least one transmitter and the at least one receiver include coils around the insulating member. The apparatus may also include a processor configured to analyze data resulting from activation of the at least one transmitter antenna with the logging tool in the wellbore. In yet another aspect, the apparatus may further include a centralizer configured to maintain the tool body substantially centered in the wellbore during logging of the wellbore and thus reduce an effect of the eddy currents passing through the wellbore fluid between the at least one transmitter and the at least one receiver.

The foregoing disclosure is directed to certain specific embodiments for ease of explanation. Various changes and modifications to such embodiments, however, will be apparent to those skilled in the art. All such changes and modifications are to be considered as a part of this disclosure.

What is claimed is:

1. An apparatus for use in a wellbore for estimating a property of a formation, comprising:
    a transmitter configured to induce electromagnetic waves in the formation;
    a receiver configured to provide signals responsive to the induced electromagnetic waves;
    a conductive member between the transmitter and the receiver extending outward from a tool body configured to reduce propagation of eddy currents through a fluid in the wellbore between the transmitter and the receiver; and
    a processor configured to process the signals provided by the receiver to estimate the property of the formation.

2. The apparatus of claim 1, wherein the conductive member includes a metallic member extending outward from the tool body.

3. The apparatus of claim 2, wherein the metallic member is configured to allow passage of the fluid between the transmitter and the receiver.

4. The apparatus of claim 2, wherein the metallic member is coupled to the tool body and an outer member, and wherein the metallic member occupies more than one half of a space between the tool body and the outer member.

5. The apparatus of claim 1, wherein the conductive member is placed about a non-conductive member on the tool body.

6. The apparatus of claim 1 further comprising a secondary conductive member spaced from the transmitter and configured to reduce an effect of eccentricity of the tool body on the signals provided by the receiver.

7. The apparatus of claim 1 further comprising a centralizer configured to maintain the tool body substantially centered in the wellbore to reduce an effect of the eddy currents passing through the fluid in the wellbore between the transmitter and the receiver.

8. The apparatus of claim 7, wherein the centralizer is substantially nonconductive.

9. The apparatus of claim 1, wherein the tool body comprises a central conducting member and an outer insulating member and wherein the transmitter and the receiver each include a coil around the outer insulating member.

10. The apparatus of claim 1, wherein the processor is located at one of: a surface location and in the tool body.

11. A method of estimating a property of a formation, comprising:
    conveying a tool including a transmitter and a receiver into a wellbore containing a fluid;
    inducing electromagnetic waves in the formation using the transmitter;
    reducing propagation of eddy currents traveling in the fluid between the transmitter and the receiver using a conductive member extending outward from the tool body between the transmitter and the receiver;
    detecting signals responsive to the induced electromagnetic waves in the formation using the receiver; and
    processing the detected signals by a processor to estimate the property of the earth formation.

12. The method of claim 11 further comprising reducing an effect of eccentricity of the tool body on the detected signals using a secondary conductive element spaced from the transmitter.

13. The method of claim 11 further comprising placing a substantially nonmetallic member extending outward from the tool body and spaced from the transmitter to reduce an effect of eccentricity of the tool body on the detected signals.

14. The method of claim 13 further comprising substantially centralizing the tool in the wellbore when detecting the signals.

15. The method of claim 11 further comprising configuring the conductive member to allow passage of the fluid between the transmitter and the receiver.

16. The method of claim 15, wherein the conductive member includes a metallic member connected to the tool body at a first end and to a member extending outward from the tool body at a second end.

17. The method of claim 11 further comprising locating the transmitter and the receiver on a nonconductive member on the tool body.

18. An apparatus for use downhole, comprising:
- a tool configured to be conveyed into a wellbore, the tool including a transmitter configured to transmit electromagnetic waves; a receiver configured to detect signals from a formation responsive to the transmitted electromagnetic waves; and
- a conductive member between the transmitter and the receiver extending outward from a tool body configured to reduce propagation of eddy currents between the transmitter and the receiver when the tool is downhole.

19. The apparatus of claim 18 further comprising a conveying member coupled to the tool configured to convey the tool into a wellbore.

20. The apparatus of claim 18 further comprising a processor configured to process the detected signals to provide information relating to a parameter of interest.

* * * * *